United States Patent [19]

Pasternack

[11] 4,188,947
[45] Feb. 19, 1980

[54] BREATHING DEVICE HAVING A COOLANT CHAMBER

[75] Inventor: Adalbert Pasternack, Bad Schwartau, Fed. Rep. of Germany

[73] Assignee: Drägerwerk Aktiengesellschaft, Fed. Rep. of Germany

[21] Appl. No.: 866,238

[22] Filed: Jan. 3, 1978

[30] Foreign Application Priority Data

Jan. 7, 1977 [DE] Fed. Rep. of Germany ....... 2700492

[51] Int. Cl.² .............................................. A62B 7/00
[52] U.S. Cl. .......................... 128/202.26; 128/204.15
[58] Field of Search ............... 128/191 R, 142 R, 212, 128/142.2

[56] References Cited

U.S. PATENT DOCUMENTS 3,385,293  5/1968  Phillips ........................... 128/191 R

FOREIGN PATENT DOCUMENTS 18932  of 1912  United Kingdom ................. 128/191 R
447334  5/1936  United Kingdom ................. 128/191 R
1086806  10/1967  United Kingdom ....................... 128/212
1170702  11/1969  United Kingdom ................. 128/142 R Primary Examiner—Henry J. Recla
Attorney, Agent, or Firm—McGlew and Tuttle

[57] ABSTRACT

A breathing device for carrying by a person, comprises a support frame adapted to be slung over the back of a person, which has a container affixed thereto for a coolant, such as a dry ice. The exterior wall of the container comprises a contact wall of a good heat-conducting material which has an exterior side which is covered by a breathing bag. The breathing bag is connected to a breathing line for respiratory use by the wearer and the breathing line has an oxygen liberating canister for adding oxygen to it. The air which is circulated over the breathing bag is cooled by the contact surface of the container for the refrigerant.

8 Claims, 2 Drawing Figures

BREATHING DEVICE HAVING A COOLANT CHAMBER

FIELD AND BACKGROUND OF THE INVENTION

This invention relates to respirators in general and, in particular, to a new and useful breathing apparatus having a chemical cartridge for the absorption of exhaled carbon dioxide and/or the development of oxygen, and including a coolant-containing cooling device.

DESCRIPTION OF THE PRIOR ART

In circulation equipment, among other means, a carbon dioxide cartridge is used for the regeneration of exhaled air, which is generally filled with an alkali-hydroxide-based absorbent. In a carbon dioxide, bond reaction heat is released, which heats the equipment and the breathing air. The same applies to breathing equipment having chemical cartridges, in which oxygen is developed.

A known type of breathing equipment with breathing air circulation has a cooling device for cooling the breathing air. For this purpose, the coolant is located in a container, arranged inside of a breathing bag. In this case, the rod-like developed coolant container is enveloped by a perforated sleeve. In this way, the breathing air drawn from the breathing bag for inhaling is forced along the cooling cartridge. The effect of this cooling device is limited to the cooling of breathing air. To maintain the output capacity of the equipment carrier, however, this is insufficient in many cases. See German Pat. No. 1,248,474.

A type of breathing equipment having a chemical cartridge for the absorption of exhaled carbon dioxide and/or development of oxygen, is also known, which has a dry ice-containing cooling device. The coolant container is arranged on the chemical cartridge side, which is turned toward the body of the equipment carrier. It is extended by a downwardly directed, back-covering planar cooler in which evaporating carbon dioxide enters through one or more lines or a large surface flat hollow space. The cooler consists of an elastic, flexible, porous gas-permeable material, in which the lines are embedded. The latter are provided with lateral passages through which the evaporated carbon dioxide enters the gas-permeable material. In this way, the cooling effect is extended to not only cover the temperature of the breathing air, but also the immediate cooling of part of the equipment carrier body. The cooling of the breathing air is limited, however, by the cooling device of this breathing equipment, because only part of the outer surface of the chemical cartridge is affected by the cooling device. No cooling of the large area breathing bag takes place. The output of the planar cooler is limited by the low heat capacity of the gaseous carbon dioxide. See German Pat. No. 1,301,725.

SUMMARY OF THE INVENTION

The present invention provides an improved cooling device for breathing equipment in which not only is a better cooling of the breathing air obtained, but the output of the equipment carrier is maintained by a better cooling of maximally largest body surfaces.

According to the invention, the coolant is located in a coolant bag which is accommodated in the space between a contact wall against the breathing bag and the back of the equipment carrier. The advantages obtained with this invention are primarily that the coolant filled coolant bag, which is directly applied to the back of the equipment carrier, adapts itself very well and simultaneously in respect to heat transfer, because the weight of the breathing equipment is solidly pressed against the contact wall. Thus, a positive heat transfer is effective both to the breathing bag and that part of the chemical cartridge which faces the upper part of the coolant bag.

In a development of the invention, the coolant bag is enveloped by an insulator layer except for the interface with the contact wall. This advantageously simple design allows for a direct heat transfer at the contact surface with a low temperature to adjacent equipment parts. The insulator layer prevents adjacent body portions of the equipment carrier from getting undercooled.

With another development of the invention, where the coolant bag is attachable to the contact wall and is equipped on its bottom with a feed sleeve having a lock, a simple removal and refill after use is feasible. After supplying the new coolant, it can be equally reinserted in a simple manner.

A still better cooling results from the use of carbon dioxide snow because of its low evaporating temperature. This is the case if the lock has one or more gas flow-off pipes. The $CO_2$— gas released on heatup then flows through the gas flow-off pipes in the direction of the breathing bag and, in the process, is mixed with the ambient air in the breathing equipment flowing around the breathing bag and chemical cartridge and, in so doing, cools the air.

In another development of the invention, the contact wall has surface extending deformations so that the contact interface of the coolant bag with the contact wall is increased and, accordingly, the heat transfer grows in magnitude.

Accordingly it is an object of the invention to provide an improved device for breathing or respiration which includes a support frame carrying a refrigerant container with a conductive wall over which a breathing bag is positioned which is connected in a breathing line for respiration by the wearer, the arrangement being that the refrigerant bearing against the contact wall cools the circulating breathing air.

A further object of the invention is to provide a breathing device having a coolant chamber which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
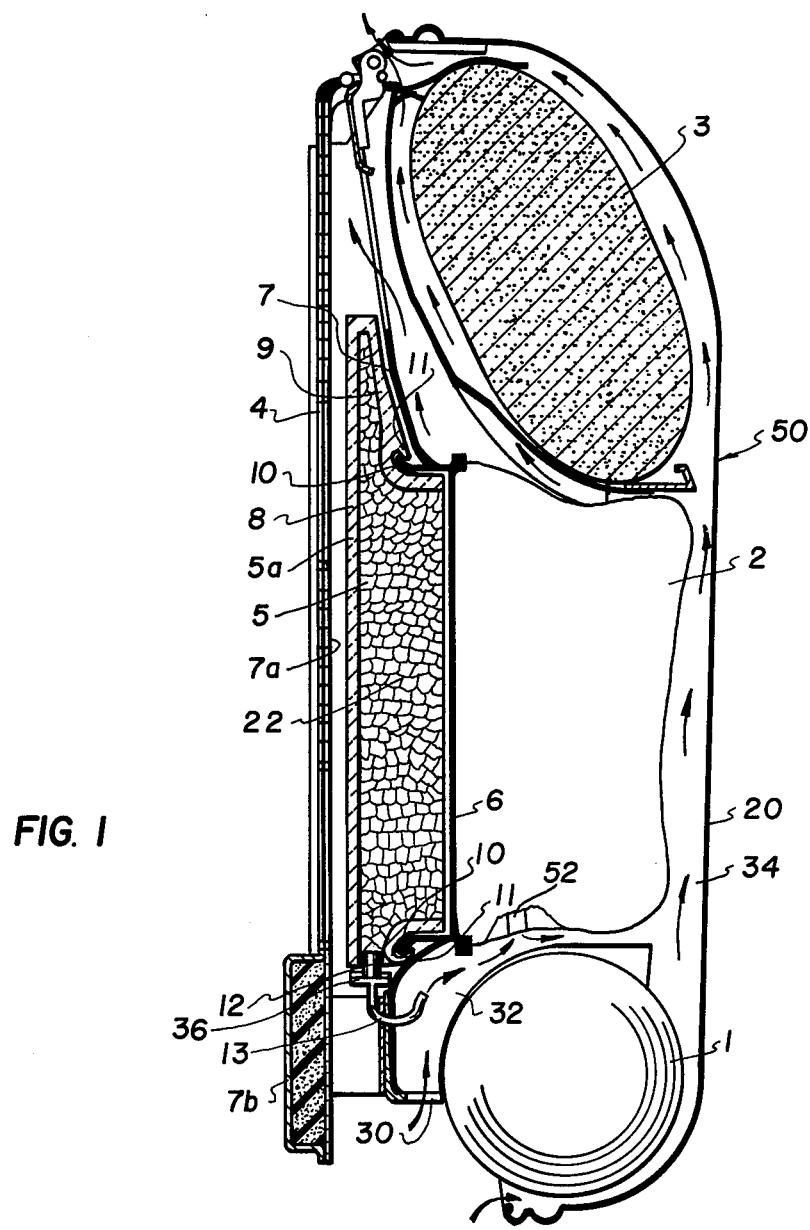
FIG. 1 is a sectional view of a breathing device constructed in accordance with the invention.

Referring to the drawings in particular, the invention embodied therein in FIG. 1, comprises a breathing device, generally designated 50, which is adapted to be worn on the back of a wearer and which includes a support frame 7 having a back plate portion 7a which is adapted to bear against the wearer and which includes a lower insulated part 7b forming a pad for cushioning the device.

In accordance with the invention, a refrigerant container or bag 5 has a rear wall 5a of insulating material so as to not unduly cool the wearer's back and it contains a refrigerant, for example, such as a dry ice 22. In accordance with the invention, the container includes a heat-conducting contact wall 6 of a good heat-conducting material which bears against a breathing bag 2. Means are provided for circulating respirator air in through a breathing air inlet 30 to and from the breathing bag 2 for flow into line 52 and then out of line 52 during inhalation and exhalation and then around the bag 2 in a breathing passage or line 34 defined around the breathing bag 2 in a to and fro respiratory circulating path which extends over both sides of an oval-shaped chemical cartridge 3. The cartridge 3 adds oxygen to the breathing air by a chemical reaction of an exothermic-reacting $CO_2$— absorbing oxygen liberating canister within the cartridge 3. The line 34 is also connected to the discharge of an oxygen bottle 1.

The breathing equipment operates according to the circulation principle and contains a chemical cartridge 3, which contains a carbon dioxide binder chemical or also a chemical, which simultaneously develops oxygen, and a breathing bag 2 and oxygen bottle 1, all of which are accommodated in a housing 20, which is carried on the back of a carrier.

In order to reduce the breathing air temperature, a coolant bag 5 consisting of movable or flexible material is arranged on that side of the chemical cartridge 3 and breathing bag 2 which faces the back of the equipment carrier. Coolant bag 5 is filled with carbon dioxide snow and/or water ice particles 22 and has substantially the same dimension perpendicular to the plane of protection as has the breathing equipment. Both the breathing air and the back portion of the equipment carrier are cooled by the contents of the coolant bag 5.

In the design according to FIG. 1, a solid contact wall 6 forms a common contact surface between breathing bag 2 and coolant bag 5. In this case, contact wall 6 is a component part of a supporting frame 7 of the breathing equipment.

The breathing air flows into breathing bag 2 through an inlet 30, passage 32, passage 34 and an inlet 36 by circulation breathing and brushes contact wall 6 which is separated from the breathing air only by the material of breathing bag 2 so that the air is cooled. When the housing is supported on the wearer's back, the breathing equipment presses against the wearer's back because of its weight. Thereby, an elastic back-bracing wall 4 is pushed against a movable wall 8 of coolant bag 5. The close contact of the back surface of the wall 8 with the coolant bag 5 results in an intensive heat transfer and, thus, to a cooling of the body surface of the wearer at this point. In order to prevent undercooling of the back and also to reduce the coolant consumption conditioned by the ambient temperature, the coolant bag 5 is enveloped on all sides with an insulator layer except over the contact wall 6. Coolant bag 5 can be moved into and out of the frame 7 without making any contact with the breathing air flow paths. This is accomplished by hook-in ridges 10 present on contact wall 6 through which bulge 11 of coolant bag 5 is clinched. The sliding in and/or out of coolant bag 5 between back bracing 4 and supporting frame 7 is carried out perpendicular to the plane of projection. An effective cooling of breathing air and back portion of the equipment carrier uniformly maintained over the entire equipment operational period is accomplished by the flat design of coolant bag 5 and by its interface with contact wall 6. Contact wall 6 consists of a good heat-conducting material. The equipment weight presses the bag 5 against the contact wall 6. A feed sleeve 12 attached to the bottom of coolant bag 5 is provided with a gas flow-off pipe 13 equipped with a valve lock 36. When dry ice is used as a refrigerant 22, $CO_2$-gas flows off through said gas flow-off pipe 13 and it is mixed with the ambient air circulating around the breathing equipment, and cools the air in the process.

Figure 2:
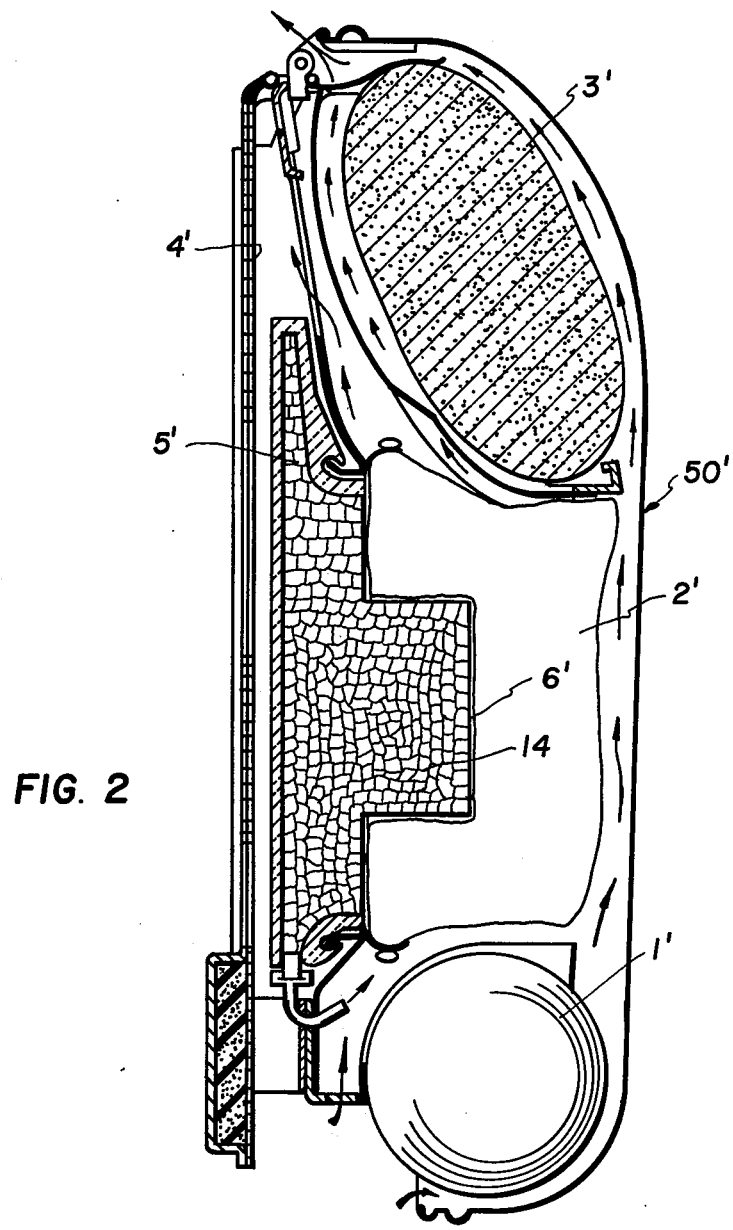
FIG. 2 is a view similar to FIG. 1 of another embodiment of the breathing device.

In the design according to FIG. 2, the coolant bag 5' includes a protruding part 14 in engagement with a contact wall 6'. The cooling effect on breathing bag 2 is increased by the expansion of the heat exchanger surface. The respirator, generally designated 50', shown in FIG. 2, is similar to that shown in FIG. 1, and similar parts are designated with similar numbers, but with primes.

While specific embodiments of the invention have been shown and described in detail to illustrate the application of the principles of the invention, it will be understood that the invention may be embodied otherwise without departing from such principles.

What is claimed is:

1. A breathing device for carrying by a person comprising a support frame having a flexible back-frame wall for engaging against the person's back, a flat container for a coolant mounted on said frame and having a coolant therein and including a container rear wall substantially parallel to and spaced from said frame rear wall and having respective opposite top and bottom walls at each end and a front contact wall of a good heat-conducting material in engagement on its interior side with the coolant and having an exterior exposed side, a breathing bag having one side overlying and contacting said front contact wall and secured to said support frame and a remaining portion extending outwardly from said front contact wall, a cartridge having a canister with an exothermic reacting $CO_2$ absorbing and oxygen-liberating substance for supplying oxygen mounted on said frame above said breathing bag, a cover connected to said frame and overlying and being spaced from said cartridge and said breathing bag, said frame and said cover defining an air inlet below said breathing bag and a breathing passage means from said air inlet to and into and out of said bag and around the exterior portion of said bag which is not overlying said contact wall and around the exterior of said cartridge to a person for respiration and acting to cool said cartridge.

2. A breathing device according to claim 1, wherein said container rear top and bottom walls are made of insulation material.

3. A breathing device, as claimed in claim 1, including means securing said breathing bag to said contact surface.

4. A breathing device, as claimed in claim 1, wherein said coolant comprises carbon dioxide snow.

5. A breathing device, as claimed in claim 1, including a gas flow-off pipe connected to the lower end of said container for the coolant and having a lock valve therein.

6. A breathing device, as claimed in claim 1, wherein said contact wall has a plurality of surface expanding deformations.

7. A breathing device, as claimed in claim 1, wherein said cartridge means includes a chemical cartridge mounted over said breathing bag and bearing downwardly thereon to urge said breathing bag into engagement with said contact surface.

8. A breathing device according to claim 1, wherein said front contact wall includes an intermediate portion between the length thereof which projects outwardly, said breathing bag extending over each end of said front contact wall and the intermediate projecting portion.

* * * * *